Feb. 12, 1963  A. A. BORGHARD ET AL  3,077,553
SERVO SYSTEM HAVING ACCELEROMETER RESPONSIVE
FILTERING OF SPURIOUS MECHANICAL
SIGNAL COMPONENT
Filed Oct. 25, 1960
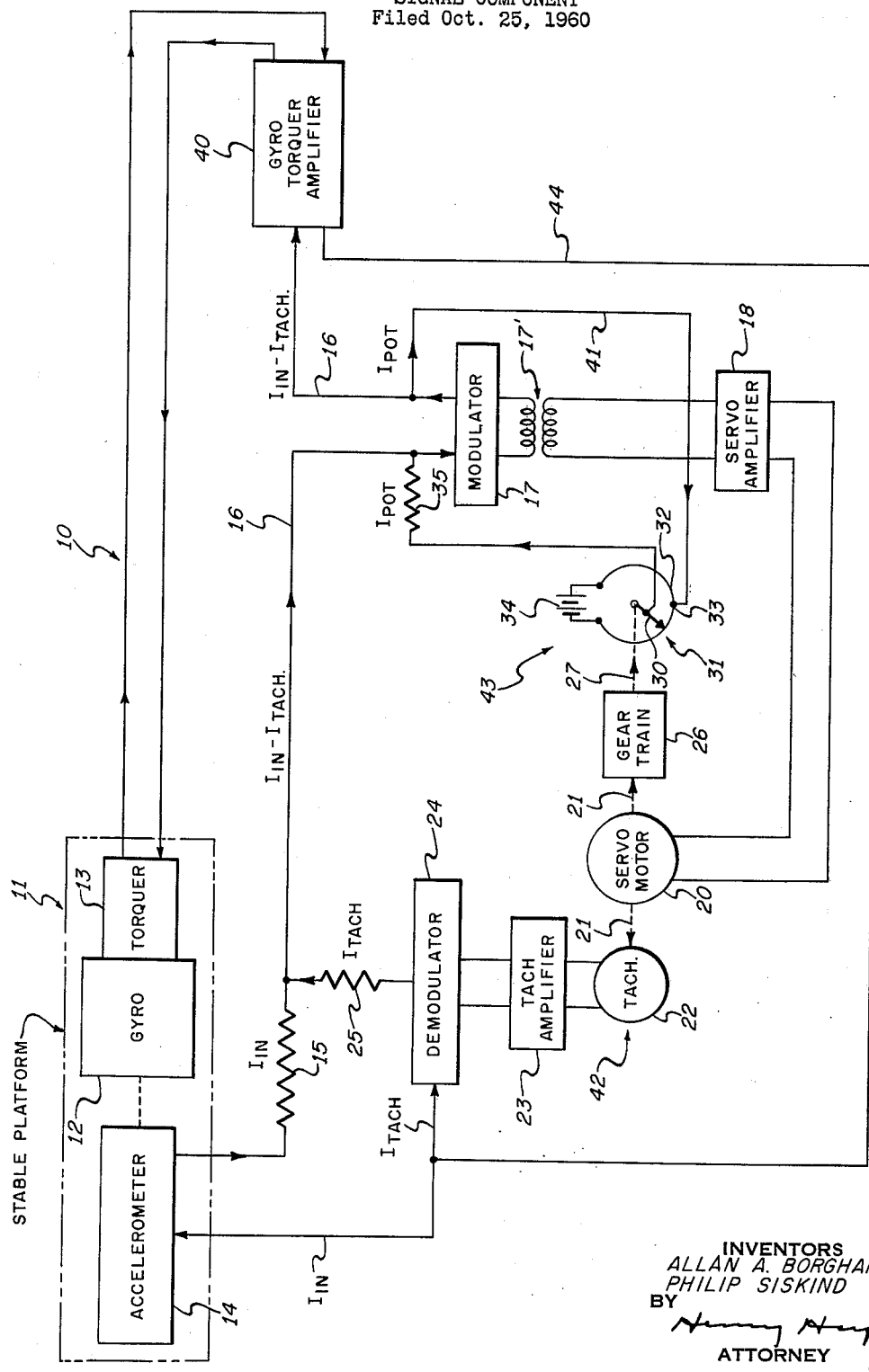
INVENTORS
ALLAN A. BORGHARD
PHILIP SISKIND
BY
ATTORNEY 3,077,553
Patented Feb. 12, 1963

3,077,553
SERVO SYSTEM HAVING ACCELEROMETER RESPONSIVE FILTERING OF SPURIOUS MECHANICAL SIGNAL COMPONENT
Allan A. Borghard, South Huntington, and Philip Siskind, Great Neck, N.Y., assignors to Sperry Rand Corporation, Great Neck, N.Y., a corporation of Delaware
Filed Oct. 25, 1960, Ser. No. 64,809
8 Claims. (Cl. 318—28)

This invention relates to servomechanisms and particularly to servo systems having means for filtering an undesirable portion of the input signal.

An example of an application of a system of this type is in conjunction with a gyroscopic stable platform utilized on a movable craft in which the stable platform employs accelerometers as vertical references. Accelerometers used for this purpose are responsive to the motion of the craft as well as to the tilt of the stable platform. For successful operation of the system, it is necessary to filter the signal from the accelerometer in order that the portion of the signal due to the motion of the ship is suppressed. It is characteristic of accelerometer signals of this type that the undesired craft's motion signals are of a much higher frequency than the platform tilt signals.

The present invention provides a servo system which attenuates the high frequency portion of the accelerometer signal and passes the low frequency portion directly to the signal utilization device which in this case is a gyro torquer amplifier.

Conventional electronic methods of filtering the accelerometer signal are impractical because the frequencies involved would require a prohibitive value of capacitance.

It is an object of the present invention to provide a servo system having low pass filtering characteristics which attenuates undesirable high frequency components of an input signal.

It is an additional object of the present invention to provide a system having means for filtering an undesirable portion of the input signal while connecting the input signal generating means directly to the signal utilization device.

The above objects are achieved by the present invention which has a servo system utilizing an accelometer for providing an input signal having undesirable high and desirable low frequency components. A servomotor is responsive to the total input signal and provides rotation in accordance therewith. A tachometer generator is responsive to and generates a signal representing the speed of rotation of the servomotor. By means of a first servo loop, the tachometer generator provides a signal having high frequency characteristics substantially equal to those of the input signal in opposition to the input signal thereby eliminating the undesirable high frequency portion of the input signal. A second servo loop which also includes the aforementioned servomotor has a potentiometer connected through a high ratio gear train to the servomotor. The potentiometer output signal is equal to the low frequency portion of the input signal and is fed back to the system in order to drive the first servo loop to zero. In order to eliminate the effect of the potentiometer feedback signal in the signal utilization apparatus, the signal return to the potentiometer is fed back to the potentiometer directly and not through the signal utilization apparatus.

By directly connecting the signal utilization apparatus through the servomotor control means to the accelerometer, any errors which might otherwise be introduced by the first and second servo loops cause only a momentary standoff thereby providing a system which is responsive only to the desirable low frequency components of the input signal without the possibility of the auxiliary equipment introducing long term errors.

These and other objects will appear from the following specification and claims when read in conjunction with a schematic wiring diagram of a preferred embodiment of the invention.

For purposes of example, the present invention will be applied with respect to a servo system 10 utilized in conjunction with a gyroscopic stable platform 11 which in turn is mounted upon a navigable craft. It will become obvious that the teaching of the present invention is equally applicable to other systems requiring signal filtering.

The stable platform 11 includes an inertial device such as a gyroscope 12 having a torquing device 13 and an accelerometer 14. The accelerometer 14 functions as a vertical reference and may be of the torque feedback type which provides a D.C. signal having a magnitude and polarity varying in accordance with the amount and direction of tilt of the stable platform 11. The D.C. signal from the accelerometer 14 due to the tilt of the stable platform 11 has a very low frequency in the order of 5 cycles per hour.

The accelerometer 14 is also responsive to the accelerations of the craft upon which it is mounted. It is characteristic of the signals from the accelerometer due to the craft motion that they are of a much higher frequency than the stable platform tilt signals. For example, the frequency of the signals due to the motion of a marine craft may be in the order of 12 cycles per minute. The composite input signal into the servo system 10 from the accelerometer 14 thus includes an undesirable high frequency component due to the craft acceleration and a desirable low frequency component due to the stable platform tilt. As mentioned above, conventional electronic methods of filtering are impractical because of the low frequencies involved.

The present invention electromechanically attenuates the high frequency portion of the accelerometer signal and passes the low frequency portion thereof unaltered. As shown in the drawing, the accelerometer 14 is connected through a resistor 15 by means of a lead 16 to a modulator 17 which modulates the D.C. signal and applies it by means of the secondary of a transformer 17' to a high gain servo amplifier 18. The transformer 17' may actually be a portion of the modulator circuit 17 but it is shown separately for purposes of clarity to indicate a current path directly from the accelerometer 14 through the primary of the transformer 17' to the load. The amplified signal from the servo amplifier 18 is connected to drive a servomotor 20 which has its output shaft 21 connected to rotate a tachometer generator 22. The signal from the tachometer generator 22 is amplified in a tachometer amplifier 23 and demodulated in a demodulator 24. The demodulated tachometer generator signal is connected through a resistor 25 to the lead 16 and applied in opposition to the accelerometer signal.

The output shaft 21 of the servomotor 20 is also connected to a high ratio gear train 26 which in turn has its output shaft 27 connected to rotate the wiper 30 of a circular potentiometer 31. The resistive winding 32 of the potentiometer 31 has a center tap 33. The extremities of the resistive winding 32 are connected to a source of constant potential 34. The potentiometer signal from the wiper 30 of the potentiometer 31 is connected through a resistor 36 to the lead 16 between the accelerometer 14 and the modulator 17 in opposition to the signal from the accelerometer 14.

The lead 16 continues through the modulator 17 and the primary of the transformer 17' to connect to a gyro torquer amplifier 40 which in turn is connected to the gyro torquing device 13.

In order to cancel the effects on the amplifier 40 of the signal introduced from the potentiometer 31, a lead 41 provides a signal return connection from the lead 16 between the modulator 17 and the gyro torquer amplifier 40 to the center tap 33 of the potentiometer 31. The signal return from the gyro torquer amplifier 40 is through a lead 44 to the accelerometer 14 and the demodulator 24.

In operation, the accelerometer 14 senses the tilt of the stable platform 11 as well as the accelerations of the craft and provides a composite input signal in accordance therewith. The input current, $I_{in}$, is thus composed of low frequency components due to gyro drift causing tilt and high frequency components due to craft accelerations.

For ease of understanding, the servo system 10 may be considered as including first and second servo loops 42 and 43 respectively. The first loop 42 includes a portion of the lead 16, the modulator 17, the transformer 17', the servo amplifier 18, the servomotor 20, the tachometer generator 22, the amplifier 23, the demodulator 24 and the resistor 25. The second servo loop 43 includes a portion of the lead 16, the modulator 17, the transformer 17', the servo amplifier 18, the servomotor 20, the gear train 26, the potentiometer 31 and the resistor 35.

While the operation of the first and second servo loops 42 and 43, respectively, is simultaneous, it may be seen more clearly if the operation of each loop is considered separately since the first loop 42 is responsive to the high frequency components of the input signal while the second loop 43 is responsive to the low frequency components thereof. With an input signal supplied from the accelerometer 14 through the modulator 17 and the transformer 17' to the servo amplifier 18, the servomotor 20 is rotated at a speed and in a direction in accordance with the magnitude and polarity respectively of the input signal.

The tachometer generator 22 follows the high speed rotation of the servomotor 20 to provide an A.C. signal having an amplitude and phase in accordance with the speed and direction respectively of the rotation of the servomotor 20 representative of the high frequency component of the input signal. After being amplified and demodulated in the amplifier 23 and the demodulator 24 respectively, the signal is passed through the resistor 25 and the current from the tachometer, $I_{tach}$, opposes the input signal current, $I_{in}$, thereby eliminating the undesirable high frequency component of the input signal. The high frequency component of the input signal does not provide a signal from the potentiometer 31 because of the high gear ratio of the gear train 26 and the low duration of a high frequency signal of a particular polarity it is not possible to drive the wiper 30 of the potentiometer 31 far enough to provide a substantial signal therefrom.

The low frequency component of the input signal drives the servomotor 20 slowly and long enough in one direction so that the wiper 30 of the potentiometer 31 is driven through the gear train 26 a sufficient distance to produce an output signal which is passed through the resistor 35 to produce a current, $I_{pot}$, which opposes the input current, $I_{in}$. There is no signal from the tachometer generator 22 representative of the low frequency component of the input signal because of the slow rotation of the servomotor 20.

Since the first and second servo loops 42 and 43 respectively are nulling devices, the signal into the modulator 17 causes the input signal minus the tachometer signal minus the potentiometer signal to equal zero, or to consider it another way, it causes the input signal minus the tachometer signal to be equal to the potentiometer signal. Therefore, the input signal minus the tachometer signal, $I_{in} - I_{tach}$, is applied to the gyro torquer amplifier 40 while the potentiometer signal, $I_{pot}$, does not flow through the load, i.e., the amplifier 40. The output signal from the gyro torquer amplifier 40 is applied to the torquer 13 to cause precession of the gyro 12 and thereby level the stable platform 11 in accordance with the desirable low frequency components of the input signal only. Thus, the system operates as an electromechanical low pass filter which attenuates the undesirable high frequency components.

It will be noted that the gyro torquer amplifier 40 is directly connected by means of the lead 16 through the modulator 17 and the primary of the transformer 17' to the accelerometer 14. By this arrangement, the signal current from the accelerometer 14 passes directly to the load, i.e., the amplifier 40. Thus, if there is a malfunction of the filtering apparatus, the basic input signal continues to be supplied to the load and the malfunction produces only a momentary standoff rather than a continuous standoff as in conventional electronic filtering where the input signal is not connected directly to the load.

It will also be noted that this system is self limiting since once the signal level is of sufficient magnitude to cause the wiper 30 of the potentiometer 31 to hit its stop, the signal from the tachometer generator 22 will limit the signal in the gyro torquer amplifier 40 to that level.

The maximum amount of potentiometer current is the maximum low frequency signal that the servo filter can pass and the maximum amount of the tachometer signal is the largest high frequency signal that the filter can suppress. The gain of the loop determines the level to which the high frequency signals will be suppressed. The minimum gear train ratio is determined by the maximum magnitude and frequency of the high frequency signal and the mechanical range of the potentiometer. If the gear train ratio is too small, the maximum signal will cause the potentiometer to be run into its stop.

Although the invention has been described in terms of a servo system having a low pass filtering characteristic, it will be appreciated that the system may be readily adapted to provide high pass filtering characteristics by techniques similar to those described. For example, to provide high pass filtering characteristics of the above described servo system, the tachometer generator signal return would be connected directly to the tachometer amplifier and not through the signal utilization device while the potentiometer signal would pass through the load and the return would be from the common of the load thus permitting the high frequency component from the input signal to be applied to the load and cancelling the low frequency component. In this latter case, the return signal on the lead 41 instead of being connected back to the potentiometer 31 would be connected back to the output terminal of the demodulator 24 and the return signal on the lead 44 instead of being connected back to the demodulator 24 would be connected back to the potentiometer 31.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A servo system having filtering characteristics comprising means for providing an input signal having high and low frequency components, means including a servomotor responsive to said input signal for providing rotation in accordance therewith, first means responsive to the rotation of said servomotor for providing a first signal in opposition to said input signal having high frequency characteristics substantially equal to those of said input signal, second means responsive to the rotation of said servomotor for providing a second signal in opposition to said input signal having low frequency characteristics substantially equal to those of said input signal, means for effectively cancelling one of said first and second signals thereby providing an input signal having only a desirable frequency component, and signal utilization means responsive to the desirable frequency component of said input signal.

2. A servo system having filtering characteristics comprising means for providing an input signal having high and low frequency components, means including a servomotor responsive to said input signal for providing rotation in accordance therewith, tachometer generator means responsive to the speed of rotation of said servomotor for providing a first signal in opposition to said input signal having high frequency characteristics substantially equal to those of said input signal, means including a potentiometer responsive to the rotation of said servomotor for providing a second signal in opposition to said input signal having low frequency characteristics substantially equal to those of said input signal, means for effectively cancelling one of said first and second signals thereby providing an input signal having only a desirable frequency component, and signal utilization means responsive to the desirable frequency component of said input signal.

3. A servo system having low pass filtering characteristics comprising means for providing an input signal having undesirable high and desirable low frequency components, means including a servomotor responsive to said input signal for providing rotation in accordance therewith, a first servo loop including said servomotor and means responsive to the rotation of said servomotor for providing a signal in opposition to said input signal having high frequency characteristics substantially equal to those of said input signal, a second servo loop including said servomotor and additional means responsive to the rotation of said servomotor for providing a signal in opposition to said input signal having low frequency characteristics substantially equal to those of said input signal, means for feeding back said second servo loop signal to said additional means for effectively cancelling said second servo loop signal thereby providing an input signal having only said desirable low frequency component, and signal utilization means responsive to said desirable low frequency component of said input signal.

4. A servo system having low pass filtering characteristics comprising means for providing an input signal having undesirable high and desirable low frequency components, means including a servomotor responsive to said input signal for providing rotation in accordance therewith, a first servo loop including said servomotor and tachometer generator means responsive to the rotation of said servomotor for providing a signal in opposition to said input signal having high frequency characteristics equal to those of said input signal, a second servo loop including said servomotor and further including a high ratio gear train connected to said servomotor and a potentiometer connected to said gear train, said potentiometer providing a signal in opposition to said input signal having low frequency characteristics equal to those of said input signal, means for returning said potentiometer signal to said potentiometer for effectively cancelling said potentiometer signal thereby providing an input signal having only said desirable low frequency component, and signal utilization means responsive to said desirable low frequency component of said input signal.

5. A servo system having low pass filtering characteristics comprising means for providing an input signal having undesirable high and desirable low frequency components, signal utilization means connected to said signal providing means, motive means effectively connected between said signal providing means and said signal utilization means, said motive means being responsive to said input signal for providing rotation in accordance with the magnitude and polarity thereof, tachometer generator means responsive to the speed of rotation of said motive means for providing a signal having high frequency characteristics substantially equal to those of said input signal, means for connecting said tachometer generator signal between said signal providing means and said motive means in opposition to said input signal, a high ratio gear train connected to said servomotor for providing an output rotation in accordance with the low frequency characteristics of said input signal, a potentiometer connected to be responsive to the output rotation of said gear train for providing a signal having low frequency characteristics substantially equal to those of said input signal, means for connecting said low frequency potentiometer signal in opposition to said input signal between said signal providing means and said motive means, and means effectively connected between said motive means and said signal utilization means for returning said low frequency potentiometer signal to said potentiometer whereby said signal utilization means is responsive only to the low frequency component of said input signal.

6. A servo system having low pass filtering characteristics comprising means for providing an input signal of varying magnitude and polarity having undesirable high and desirable low frequency components, a servomotor responsive to said input signal for providing rotation in accordance with the magnitude and polarity thereof, tachometer generator means responsive to the rotation of said servomotor for providing a signal having high frequency characteristics representative of those of said input signal, means for rendering said tachometer generator signal equal and opposite to said high frequency component of said input signal for cancelling said high frequency component thereof, a high ratio gear train connected to said servomotor for providing an output rotation in accordance with the low frequency component of said input signal, a potentiometer connected to be responsive to the output rotation of said gear train for providing a signal having low frequency characteristics equal to those of said input signal, means for connecting said potentiometer signal in opposition to said input signal between said input signal providing means and said motive means, signal utilization means, and means effectively connected between said motive means and said signal utilization means for providing a return of the signal representative of said potentiometer signal to said potentiometer thereby providing a resultant signal representative of the low frequency component of said input signal, said signal utilization means being responsive to said resultant signal.

7. In combination, acceleration sensitive means for providing a D.C. signal of varying magnitude and polarity having undesirable high and desirable low frequency components, servomotor control means connected to be responsive to said acceleration signal, a servomotor connected to be responsive to said servomotor control means, a tachometer generator responsive to said servomotor for providing an A.C. signal having an amplitude and phase representative of the speed and direction of said rotation of said servomotor, said tachometer generator signal having high frequency characteristics representative of the high frequency characteristics of said acceleration signal, a demodulator responsive to said tachometer generator signal for providing a D.C. signal of varying magnitude and polarity equal to the magnitude and polarity of the undesirable high frequency component of said acceleration signal, means for connecting said demodulated signal in opposition to said acceleration signal thereby providing a modified acceleration signal having only the desired low frequency components, a high ratio gear train connected to said servomotor for providing an output rotation in accordance with the low frequency component of said acceleration signal, signal utilization means directly connected through said servomotor control means to said acceleration sensitive means, and means connected between said servomotor control means and said signal utilization means for returning the signal representative of said potentiometer signal to said potentiometer whereby said signal utilization means is directly responsive only to the low frequency component of said acceleration signal.

8. A servo system for eliminating the effects of acceleration of a navigable craft on an acceleration sensitive means mounted thereon comprising a gyroscopic stable platform mounted on said craft, said acceleration sensitive means mounted on said stable platform for providing a vertical reference, said acceleration sensitive means being responsive to the tilt of said stable platform for providing a signal having low frequency components and also being responsive to the acceleration of said craft for providing a signal having undesirable high frequency components, said acceleration sensitive means thereby providing a composite acceleration signal of varying magnitude and polarity having undesirable high frequency components and desirable low frequency components, servomotor control means connected to be responsive to said composite acceleration signal, a servomotor connected to be responsive to said servomotor control means, a tachometer generator responsive to said servomotor for providing an A.C. signal having an amplitude and phase representative of the speed and direction of said rotation of said servomotor, said tachometer generator signal having high frequency characteristics representative of the high frequency characteristics of said acceleration signal, a demodulator responsive to said tachometer generator signal for providing a D.C. signal of varying magnitude and polarity equal to the magnitude and polarity of the undesirable high frequency component of the acceleration signal, means for connecting said demodulated signal in opposition to said input signal thereby providing a modified acceleration signal having only the desired low frequency components, a high ratio gear train connected to said servomotor for providing an output rotation in accordance with the low frequency component of said acceleration signal, a potentiometer connected to be responsive to the output rotation of said gear train for providing a signal having low frequency characteristics equal to those of said input signal, means for connecting said potentiometer signal between said acceleration sensitive means and said servomotor control means in opposition to said composite acceleration signal, signal utilization means including means for precessing said stable platform directly connected through said servomotor control means to said acceleration sensitive means, and means connected between said servomotor control means and said signal utilization control means for connecting a signal representative of said potentiometer signal in feedback fashion to said potentiometer whereby said signal utilization means is directly responsive only to the low frequency component of said acceleration signal for precessing said stable platform in a direction and in an amount to eliminate said tilt thereof.

References Cited in the file of this patent
UNITED STATES PATENTS
2,951,974    Silver _____ Sept. 6, 1960